United States Patent
Harada et al.

(10) Patent No.: US 6,201,566 B1
(45) Date of Patent: Mar. 13, 2001

(54) VIDEO DISPLAY METHOD AND VIDEO DISPLAY APPARATUS

(75) Inventors: Shigeru Harada; Junji Kagita, both of Tokyo; Yoshihito Ohsawa, Saitama; Kazuhiko Fujihara, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/045,414

(22) Filed: Mar. 19, 1998

(30) Foreign Application Priority Data

Mar. 28, 1997 (JP) .................................... 9-078502

(51) Int. Cl.⁷ .......................... H04N 13/04; H04N 15/00; H04N 9/47
(52) U.S. Cl. .................................. 348/51; 348/52; 348/53
(58) Field of Search .................................. 348/42–44, 48, 348/51–53, 55–56; 345/6–7, 114; 359/462, 466–467; 396/324, 325–327

(56) References Cited

U.S. PATENT DOCUMENTS

| | | | |
|---|---|---|---|
| 4,567,513 | * 1/1986 | Imsand | 348/55 |
| 4,734,756 | * 3/1988 | Butterfield et al. | 348/53 |
| 4,736,246 | * 4/1988 | Nishikawa | 348/56 |
| 5,068,682 | * 11/1991 | Utagawa | 396/104 |
| 5,142,357 | * 8/1992 | Lipton et al. | 348/48 |
| 5,193,000 | * 3/1993 | Lipton et al. | 348/43 |
| 5,416,510 | * 5/1995 | Lipton et al. | 348/43 |
| 5,617,225 | * 4/1997 | Aritake et al. | 359/9 |
| 5,703,961 | * 12/1997 | Rogina et al. | 382/154 |
| 5,710,875 | * 1/1998 | Harashima et al. | 345/419 |
| 5,760,933 | * 6/1998 | Aritake et al. | 359/22 |
| 5,778,268 | * 7/1998 | Inaba | 396/326 |
| 5,825,456 | * 10/1998 | Tabata et al. | 351/201 |
| 5,889,878 | * 3/1999 | Togashi | 382/103 |
| 6,005,607 | * 12/1999 | Uomori et al. | 348/42 |

* cited by examiner

*Primary Examiner*—Vu Le
(74) *Attorney, Agent, or Firm*—Frommer Lawrence & Haug, LLP.; William S. Frommer; Dexter T. Chang

(57) ABSTRACT

When a 2-dimensional video image is displayed, a front/rear feeling and a stereoscopic feeling are enabled to be expressed. A detection signal Sd is formed by a high pass filter 25 and a rectifying circuit 26 in accordance with an amount of edge information. The detection signal Sd is supplied to a variable delay circuit 14L. A detection signal Sd' is supplied to a variable delay circuit 14R. The variable delay circuits 14L and 14R are controlled in accordance with the edge information amount so that a video image for the left eye and a video image for the right eye are moved in the opposite directions. Thus, an imaginary image is synthesized to the front or rear side from a display plane. The left and right video images are displayed on CRTs 20L and 20R. The projection light passes through a horizontal polarizing filter 21L and a vertical polarizing filter 21R and the left and right video images are overlapped on a screen 22. The left and right video images are separately observed by glasses 23 having polarizing filters 24L and 24R and a stereoscopic feeling is enhanced.

19 Claims, 14 Drawing Sheets

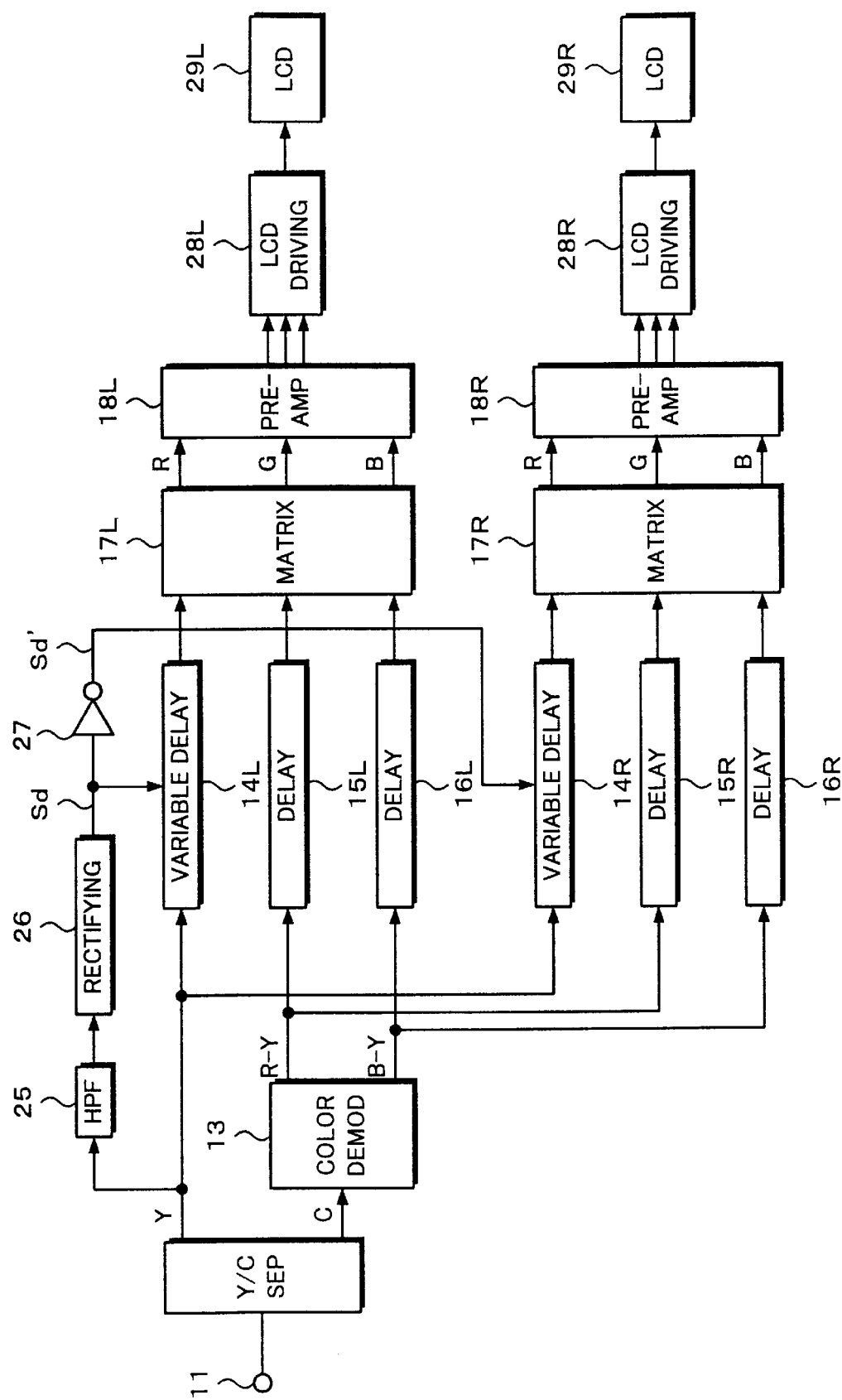

VIDEO DISPLAY METHOD AND VIDEO DISPLAY APPARATUS

BACKGROUND OF THE INVENTION

1. Field of the Invention

The invention relates to video display method and video display apparatus which can express a front/rear feeling and a stereoscopic feeling of an object to be displayed when a video image based on an input video signal is displayed.

2. Description of the Related Art

As a system having the highest realization among stereoscopic display systems, there is a stereoscopic display system using right/left parallax information. According to such a system, two cameras are used upon photographing and a video image for the left eye and a video image for the right eye are photographed so as to have parallax information. By reproducing the video images so that two images are separately projected to the right and left eyes, a stereoscopic display can be performed.

FIGS. 1A and 1B show a principle of the stereoscopic operation using a binocular (right/left) parallax. Images obtained by shifting a left-eye video image 3L and a right-eye video image 3R in the horizontal direction are displayed on a display plane 1. Usually, a focal point (a point at which the right and left lines of sight cross: such a point is called a point where the vergences are matched) of both of the left and right eyes (2L, 2R) and a focal point (a point where the adjustment of the eye in case of a single eye is matched) of each eye (2L, 2R) are located at the same position. Specifically speaking, in case of a CRT or the like, the CRT surface corresponds to the location where the vergences and the adjustments are matched. In case of a projector or the like, the screen corresponds to the location where the vergences and the adjustments are matched.

FIG. 1A shows a case of a cross vergence. In this case, the video image 3R shifted to the left is allowed to be projected to the right eye 2R and the video image 3L shifted to the right is allowed to be projected to the left eye 2L. At this time, an image is synthesized in the head as if an object existed at a location where the vergences of the right and left eyes are matched. Such an imaginary image 4A is seen as if it was projected to the front side from the display plane 1. On the other hand, FIG. 1B shows a case of a parallel vergence (non-cross vergence). In this case, the video image 3L shifted to the left is allowed to be projected to the left eye 2L and the video image 3R shifted to the right is allowed to be projected to the right eye 2R. In the parallel vergence, an imaginary image 4B is synthesized to the rear side from the display plane 1.

A technique for enabling a stereoscopic feeling to be obtained even in an ordinary two-dimensional image by using the principle of the right/left parallax is an emphasis of a stereoscopic feeling using an effect of Pulfrich. The effect of pendulum of Pulfrich denotes "when an object which reciprocates to the right and left in the vertical plane in front of the eyes is observed by both eyes while a filter (ND filter) for reducing light is attached in front of one eye, the object is seen as if it moved with a depth while drawing a locus on an ellipse in a manner such that the object exists before and behind the plane". For example, as shown in FIG. 2, in a state where an ND filter 5 is attached in front of the left eye 2L, a pendulum which reciprocates to the right and left in a plane 6 is observed. When the pendulum moves from the right to the left, the pendulum passes in front of the plane 6. On the contrary, when the pendulum moves from the left to the right, the pendulum passes through the rear side from the plane 6. Consequently, the pendulum is observed as if the locus of the pendulum formed an elliptical orbit 7.

The effect of pendulum of Pulfrich occurs because when signals from the eyes are transmitted to the cerebrum, the left eye 2L for which the light is weakened has a time delay as compared with the right eye 2R for which the light is not weakened. That is, in an example of FIG. 2, when the pendulum moves from the right to the left and is located at a position of q, the signal from the left eye 2L is delayed, so that at this moment, the left eye 2L recognizes as if the pendulum existed at a position of p. In this manner, a binocular parallax occurs and the observer feels as if the pendulum existed at a position of N by the cross vergence shown in FIG. 1A mentioned above. On the contrary, when the pendulum moves from the left to the right and exists at the position of q, the left eye 2L recognizes as if the pendulum existed at a position of r. Due to the binocular parallax, the observer feels as if the pendulum existed at a position of F by the parallel vergence shown in FIG. 1B.

Hitherto, as a method of enhancing the stereoscopic feeling of an ordinary 2-dimensional video image, a method using the foregoing Pulfrich's effect has been known. The above method, however, has a drawback such that a stereoscopic feeling (depth feeling) of only the object which moves in a specific direction is merely expressed and the effect is not derived in a still portion. Such a method also has a drawback such that the stereoscopic feeling is influenced by a moving speed and its direction of the object. In other words, the depth feeling changes depending on the moving speed and the front/rear side is unconditionally determined by the moving direction. As mentioned above, according to the conventional stereoscopic feeling emphasizing method, the stereoscopic feeling (depth feeling) for only an object which moves in a specific direction can be correctly expressed.

OBJECTS AND SUMMARY OF THE INVENTION

It is an object of the invention to provide video display method and display apparatus which can express a stereoscopic feeling even in a still portion by using a two-dimensional video signal source.

According to the invention of claim 1, there is provided a video display method of receiving a video signal and forming a video signal to be displayed on a display apparatus, comprising the steps of: detecting edge information of the input video signal; and detecting a front/rear relation of an object in a video image on the basis of the detected edge information.

According to the invention of claim 8, a video display apparatus for displaying the video image as mentioned above is provided.

According to the invention of claim 2, there is provided a video display method of receiving a video signal and displaying a video image to a display apparatus, comprising the steps of: detecting edge information of the input video signal; detecting a front/rear relation of an object in the video image on the basis of the detected edge information; controlling a position of the image so as to move in the horizontal direction on the basis of the detected front/rear relation; and displaying a video image having a right/left parallax formed as a result of the control.

According to the invention of claim 9, a video display apparatus for displaying the video image as mentioned above is provided.

According to the invention of claim 3, there is provided a video display method of receiving a video signal and displaying a video image to a display apparatus, comprising the steps of: detecting edge information of the input video signal; detecting a front/rear relation of an object in the video image on the basis of the detected edge information; modulating is depth information as stereoscopic information on the basis of the detected front/rear relation; and displaying a video image having the modulated depth information.

According to the invention of claim 10, a video display apparatus for displaying the video image as mentioned above is provided.

A video image is generally photographed by using a camera. In many cases, the camera photographs around a focused location as a center. In many cases, at such a focused location, an amplitude of a high frequency component of the video signal is higher than that of the other region. Even in an auto-focusing process of a video camera, a point of a large amplitude of the high frequency component is used as a focused point. By using such a nature, whether the region is a focused region or not is discriminated by checking to which extent the high frequency component is included. In case of the video image photographed by the ordinary video camera, there will be usually no problem even if the focused region is determined to be a foreground video image.

By using such a nature, according to the invention, a location where there is much edge information (amount of the high frequency component: an inclination of an edge and an amplitude of an edge) corresponding to the focused location is determined to be a foreground and the other region is decided to be a background. In accordance with the discrimination result, the position in the horizontal direction of the image is controlled and the right/left parallax is caused by the control. In place of the position in the horizontal direction of the image, depth information as stereoscopic information is modulated. In this manner, a stereoscopic feeling (or front/rear feeling) is expressed.

According to the invention, a video image in which the front/rear feeling and the stereoscopic feeling are emphasized can be displayed by using a 2-dimensional video signal source. According to the conventional method of using the Pulfrich's rule, a stereoscopic feeling of only a moving object can be enhanced. According to the invention, however, in not only a moving object but also a still object, a front/rear feeling and a stereoscopic feeling can be expressed.

The above and other objects and features of the present invention will become apparent from the following detailed description and the appended claims with reference to the accompanying drawings.

BRIEF DESCRIPTION OF THE DRAWINGS

FIG. 15 is a block diagram of the third embodiment using the glasses type display apparatus.

DETAILED DESCRIPTION OF THE PREFERRED EMBODIMENTS

Figure 3:
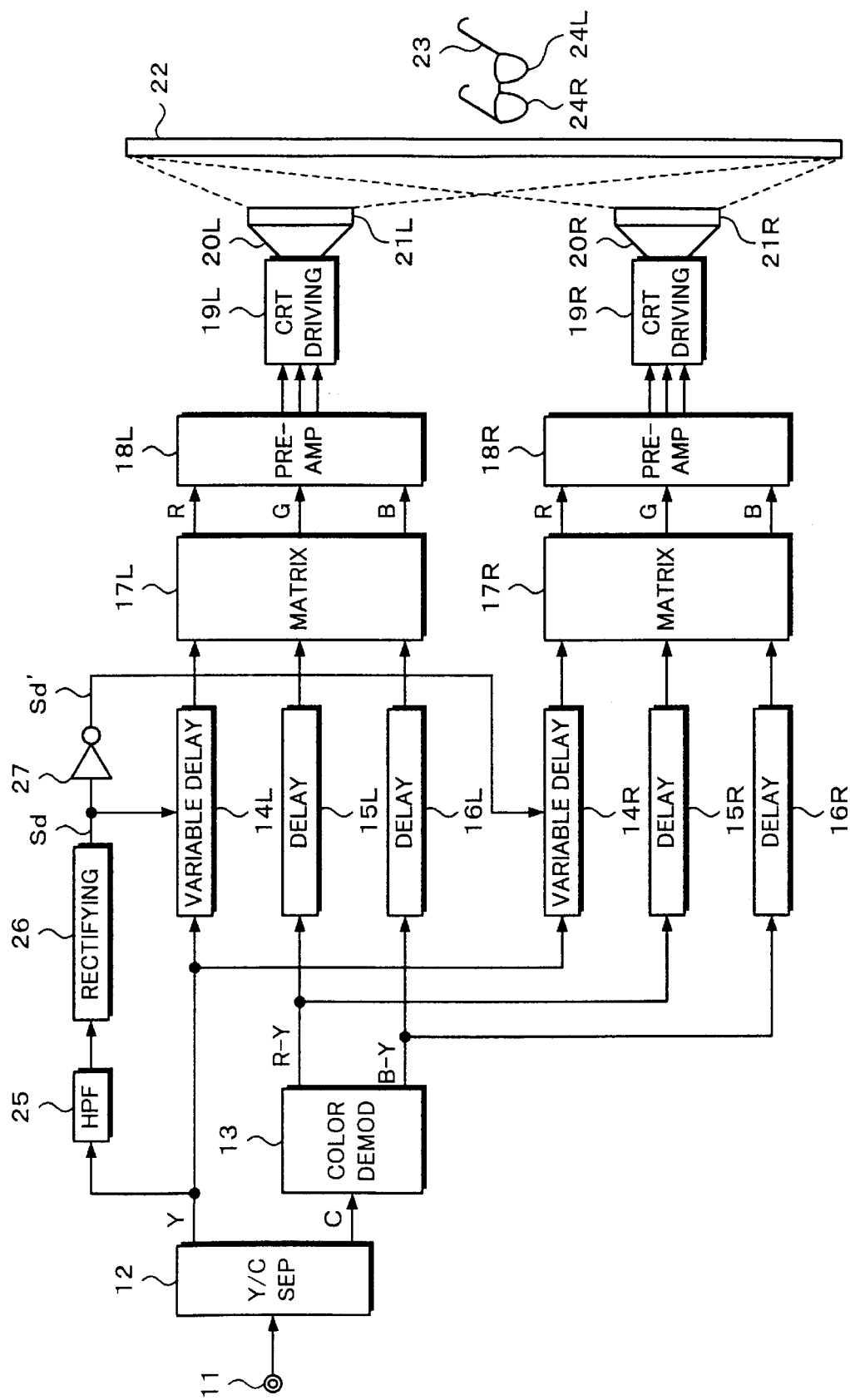
FIG. 3 is a block diagram showing the first embodiment of the invention.

An embodiment of the invention will now be described hereinbelow with reference to the drawings. FIG. 3 shows the first embodiment of the invention. The first embodiment relates to an example in which the invention is applied to a projection type display using two projectors for displaying right and left video images. In the first embodiment, the position in the horizontal direction is controlled in accordance with edge information of an input video signal, thereby generating parallax information between the right and left video images.

In FIG. 3, a two-dimensional video signal (composite color video signal) is supplied to an input terminal 11. For example, a television broadcasting signal received by an antenna and a tuner is an example of a two-dimensional video signal source. As the other sources, it is also possible to receive the 2-dimensional video signal from an analog satellite broadcasting, a digital broadcasting, or a video signal reproducing apparatus using a medium such as disk, tape, or the like.

An input color video signal is supplied to a Y/C separating circuit 12 and a luminance signal Y and a chrominance signal (carrier chrominance signal) C are separated. The chrominance signal C is supplied to a color demodulating circuit 13 and is color demodulated. Two color difference signals (R−Y and B−Y) are generated from the color demodulating circuit 13. The luminance signal Y is supplied to a variable delay circuit 14L. The color difference signals R−Y and B−Y are supplied to fixed delay circuits 15L and 16L, respectively. In a manner similar to a video signal path for the left eye, a variable delay circuit 14R and fixed delay circuits 15R and 16R are provided for a video signal path for the right eye. In the disclosure of the specification, reference characters L and R are used to express a corresponding relation between the left-eye video image and the right-eye video image.

Output signals of the variable delay circuit 14L and delay circuits 15L and 16L are supplied to a matrix circuit 17L. Output signals of the variable delay circuit 14R and delay circuits 15R and 16R are supplied to a matrix circuit 17R.

Three primary color signals R, G, and B are formed by the matrix circuits 17L and 17R. Audio signal processes are omitted here for simplicity of explanation.

The three primary color signals R, G, and B formed by the matrix circuit 17L are supplied to a CRT driving circuit 19L through a preamplifier 18L. The three primary color signals R, G, and B formed by the matrix circuit 17R are supplied to a CRT driving circuit 19R through a preamplifier 18R.

CRTs 20L and 20R for projection are driven by the CRT driving circuits 19L and 19R, respectively. Two projectors are constructed by the CRT driving circuits and the CRTS. As a projector, three CRTs which are driven by the primary color signals can be used or a liquid crystal can be also used in place of the CRT. As a projector, a construction of either the reflecting type or the transmitting type can be used.

The video image for the left eye and the video image for the right eye generated by the projectors are overlappingly displayed at the same position on a screen 22. At the time of overlapping, it is adjusted so as not to deviate the positions of the video images. The video image for the left eye which is projected by the CRT 20L is the image transmitted through a horizontal polarizing filter 21L. On the other hand, the video image for the right eye which is projected by the CRT 20R is the image transmitted through a vertical polarizing filter 21R.

By using glasses 23 having a horizontal polarizing filter 24L for the left eye and a vertical polarizing filter 24R for the right eye, the video images projected on the screen 22 by the CRTs 20L and 20R can be separately seen. The invention is not limited to the horizontal/vertical polarizing filters but filters having different polarizing directions, for example, right orientation/left orientation polarizing filters can be also used.

According to the first embodiment, by controlling so as to shift the horizontal positions of the left and right video images in the opposite directions by the variable delay circuits 14L and 14R in accordance with edge information in the input video signal, the left and right video images having parallax information are formed. At the same time, a control is performed in a manner such that in case of an object having a large amount of edge information, it is decided to be a foreground, and the image synthesis is performed on the front side by the parallax information, while in case of an object having a small amount of edge information, it is decided to be a background, and the image synthesis is performed on the rear side by the parallax information. An amount of edge information is detected on the basis of the luminance signal Y from the Y/C separating circuit 12. That is, by transmitting the luminance signal Y through a high pass filter 25 and a rectifying circuit 26, a detection signal Sd is formed.

The high pass filter 25 detects a high frequency component in the luminance signal. The high frequency component (differentiation component) includes pulses of a positive polarity and a negative polarity. The rectifying circuit 26 rectifies an output signal of the high pass filter 25 and generates the detection signal Sd having one of the positive and negative polarities. As a construction to detect the amount of edge information, a construction other than the high pass filter 25 and rectifying circuit 26 can be used. For example, it is also possible to extract an edge portion by a digital signal process, detect a magnitude of an inclination of the edge and an amplitude of the edge, and generate the detection signal Sd according to the amount of edge information.

The detection signal Sd is supplied to the variable delay circuit 14L as a signal to control its delay amount and is also supplied to an inverter 27. A detection signal Sd' inverted by the inverter 27 is supplied to the variable delay circuit 14R as a signal to control its delay amount. The inverter 27 is not limited to a construction such that the polarity is inverted but can be also constructed in a manner such that a complementary output is generated. In case of the complementary construction, now assuming that a level of the detection signal Sd lies within a range of ($0 \leq$ the level of Sd $\leq 1$), the signal having the level of (1−the level of Sd) is generated as a detection signal Sd'. Since the detection signals Sd and Sd' are supplied to the variable delay circuits 14L and 14R, the luminance signals in the left and right video signals are modulated in the opposite directions on a time base. That is, the positions in the horizontal directions of the left and right video images are controlled so as to move in the opposite directions by the detection signals Sd and Sd'. Further, the control by the detection signals Sd and Sd' which reflect the amount of edge information allows an object image having the edge to be synthesized at one of the front and rear sides.

Figure 4:
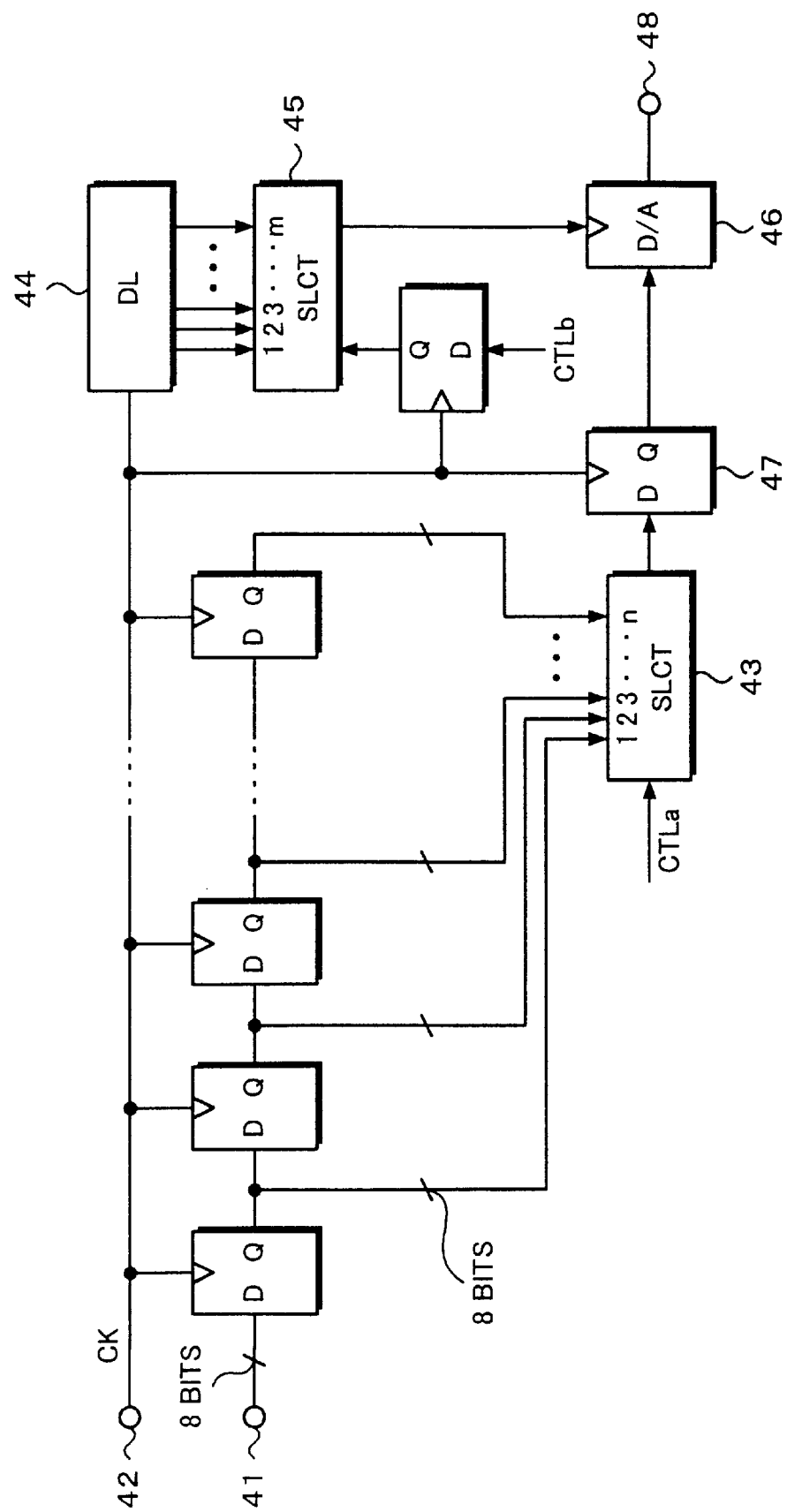
FIG. 4 is a connection diagram of an example of a variable delay circuit in the first embodiment.

As variable delay circuits 14L and 14R, constructions of a digital circuit shown in FIG. 4 can be used. In FIG. 4, the luminance signal digitized by an A/D converter (not shown) is supplied to an input terminal 41. The luminance signal is sampled at a predetermined sampling frequency and each sample is converted into data of eight bits. Reference numeral 42 denotes an input terminal of a sampling clock CK synchronized with the digital luminance signal.

Latches of n stages are serially connected to the input terminal 41. Each latch has a data input terminal D, a data output terminal Q, and a clock terminal. Each output of the latches of n stages (n=1, 2, 3, . . . , n) is supplied to a selector 43. The outputs of the latches of n stages are signals delayed by time lags of T (T: one period of a sampling clock), 2T, . . . , and nT for the input luminance data. Therefore, by selecting one of the input luminance data, the luminance data delayed by a time that is integer times as long as a clock period T can be generated by the selector 43. The selector 43 is controlled by a first control signal CTLa.

The sampling clock CK is supplied to a delay circuit 44. The delay circuit 44 delays the sampling clock CK by a time obtained by finely dividing one clock period T. Now, assuming that a time obtained by equally dividing one clock period into m time intervals is labeled as $\Delta T$ (m=1, 2, 3, . . . , m), the delay circuit 44 generates m sampling clocks having delay amounts of 0, $\Delta T$, 2 $\Delta T$, . . . , and (m−1) $\Delta T$, respectively. The delay circuit 44 can be realized by a construction such that a combination of a plurality of delay lines is changed, a construction using a time constant circuit, a construction using a clock of a frequency higher than that of the sampling clock, or the like.

The sampling clock CK selected by a selector 45 is supplied to a D/A converter 46. A control signal CTLb to select one of the m sampling clocks is supplied to the selector 45. The digital luminance signal selected by the selector 43 and transmitted through a latch 47 is supplied to the D/A converter 46. An analog luminance signal is taken out to an output terminal 48 of the D/A converter 46.

In the construction shown in FIG. 4 mentioned above, in case of a delay amount of 0, the control signal CTLa controls the selector 43 so as to select the digital luminance signal having a delay amount of n/2·T, and the control signal CTLb controls the selector 45 so as to select the sampling clock having a delay amount of m/2·$\Delta T$. Each of n/2·T and m/2·$\Delta T$ is a center value of the variable delay. In case of the variable delay circuit 14L, the control signals CTLa and CTLb are formed on the basis of the detection signal Sd. In case of the variable delay circuit 14R, the control signals CTLa and CTLb are formed on the basis of the detection signal Sd.

Since the inverter 27 is provided, the delay amounts which are caused by the variable delay circuits 14L and 14R have opposite polarities. That is, when the delay amount of $(n/2 \cdot T) + a \cdot T + (m/2 \cdot \Delta T) + b \cdot \Delta T$ is caused by the variable delay circuit 14L, the delay amount of $(n/2 \cdot T) - a \cdot T + (m/2 \cdot \Delta T) - b \cdot \Delta T$ is caused by the variable delay circuit 14R. The delays by the variable delay circuits 14L and 14R are caused to generate parallax information and enhance a stereoscopic feeling. Actually, it is also sufficient to cause a delay amount of about 1 μsec. It is sufficient to set ΔT to about a few nsec.

Figure 5:
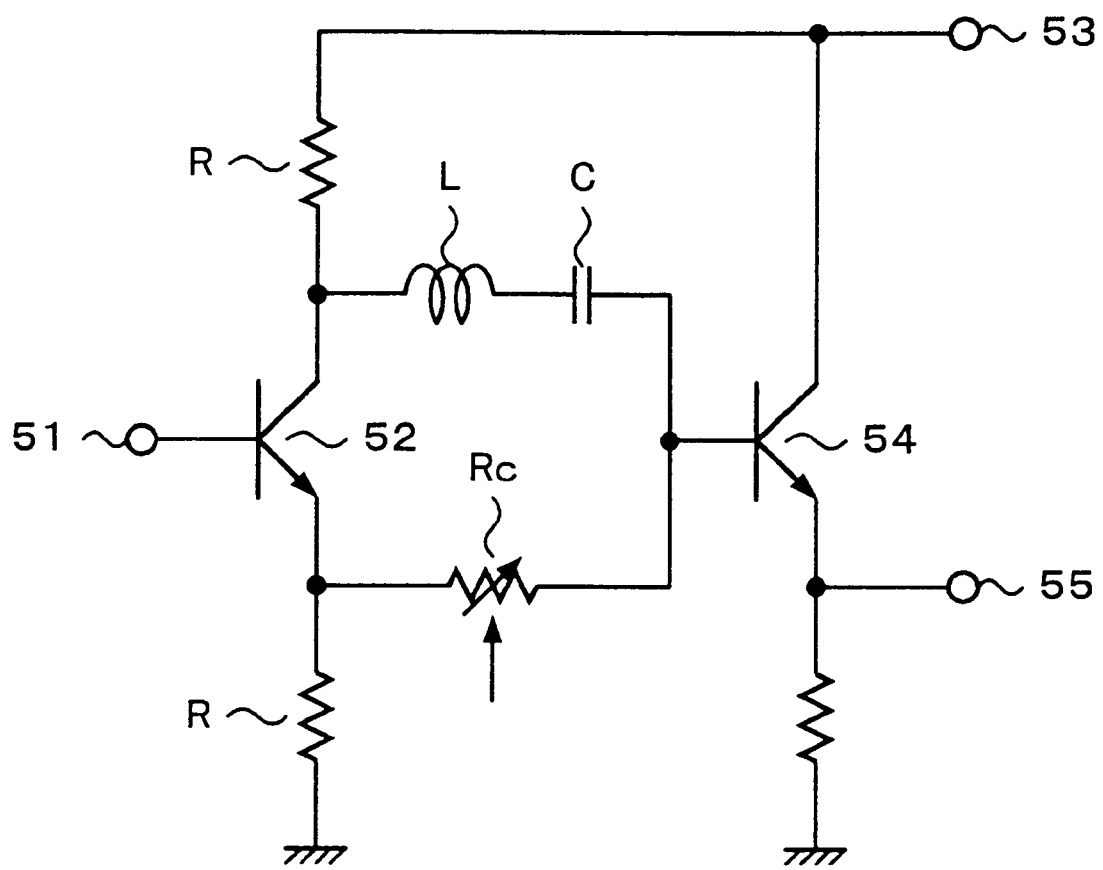
FIG. 5 is a connection diagram of another example of a variable delay circuit in the first embodiment.

Each of the variable delay circuits 14L and 14R can be also constructed by an analog circuit shown in FIG. 5. In FIG. 5, an input terminal 51 to which the analog luminance signal is supplied and a base of a transistor 52 are connected. A collector and an emitter of the transistor 52 are connected to a positive power source terminal 53 and the ground through resistors R having the same value, respectively. The collector of the transistor 52 is connected to a base of a transistor 54 through a coil L and a capacitor C. A variable resistive element Rc is connected in parallel with a serial circuit of the coil L and capacitor C. A collector of the transistor 54 is connected to the power source terminal 53. An emitter of the transistor 54 is connected to the ground through a resistor and an output terminal 55 is taken out from the emitter.

Luminance signals of opposite phases are generated at the collector and emitter of the transistor 52. A collector output signal is phase shifted by the coil L and capacitor C and is synthesized to an emitter output transmitted through the variable resistive element Rc at the base of the transistor 54. A phase shift amount, namely, a delay amount is controlled by a resistance value of the variable resistive element Rc. Therefore, by controlling the resistance value of the variable resistive element Rc in accordance with the analog detection signals Sd and Sd', a delay amount of the luminance signal which is taken out to the output terminal 55 can be controlled.

As variable delay circuits 14L and 14R, other various constructions besides the construction shown in FIG. 4 or 5 can be used. For example, a construction of an analog delay circuit formed by a CCD can be also used. As another example, a construction of a digital circuit using an RAM can be also used.

Figure 6:
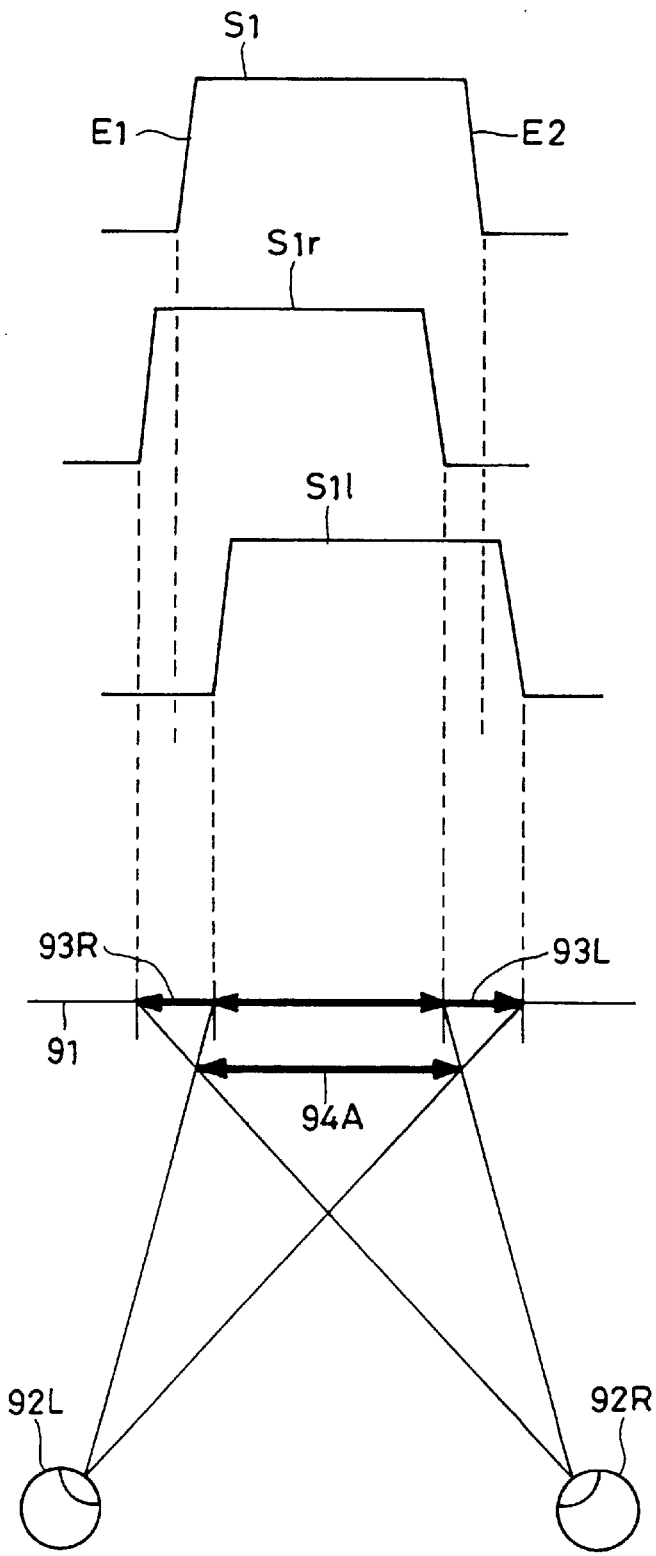
FIG. 6 is a schematic diagram for explaining the operation of the first embodiment of the invention.
Figure 7:
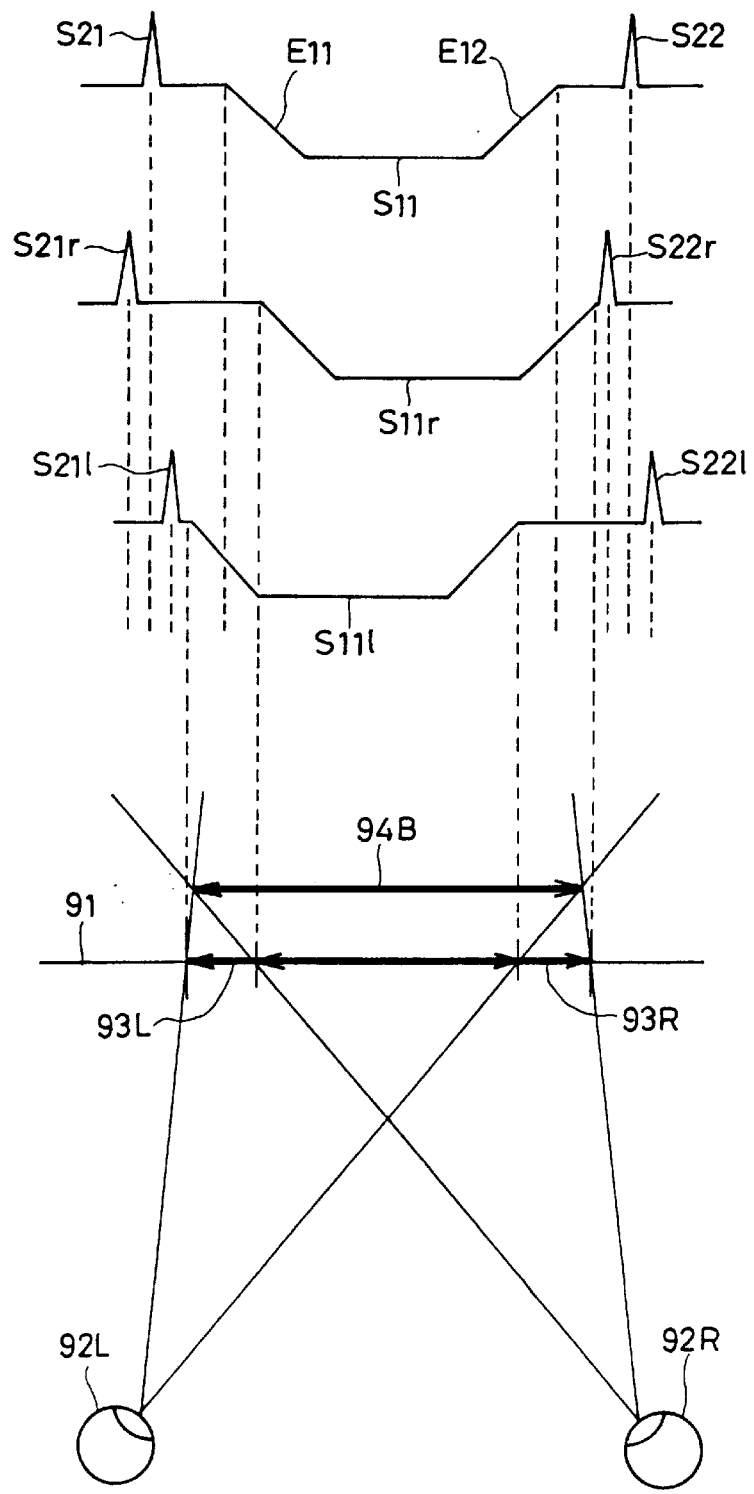
FIG. 7 is a schematic diagram for explaining the operation of the first embodiment of the invention.

Processes for enhancing a stereoscopic feeling with respect to the embodiment of the invention mentioned above will now be described with reference to FIGS. 6 and 7. In FIGS. 6 and 7, an axis of abscissa denotes a time base (namely, position in the horizontal direction) and an axis of ordinate indicates an amplitude level. The example of FIG. 6 shows processes for a signal (object) S1 having a front edge E1 and a rear edge E2 in which an inclination is steep and an amplitude is large in the input video signal. The signal S1 shown in FIG. 6 has a delay amount at the center of the variable delay circuits 14L and 14R.

In case of the signal S1, the level of the detection signal Sd is large, the delay amount of the variable delay circuit 14L is increased by the detection signal Sd, and the delay amount of the variable delay circuit 14R is decreased by the detection signal Sd'. Therefore, a delay amount for a right-eye video signal S1r corresponding to the signal S1 is reduced and the position of a right-eye video image 93R is moved to the left. On the other hand, a delay amount for a left-eye video signal S1$^l$ corresponding to the signal S1 is increased and the position of a left-eye video image 93L is moved to the right.

Figure 1A:
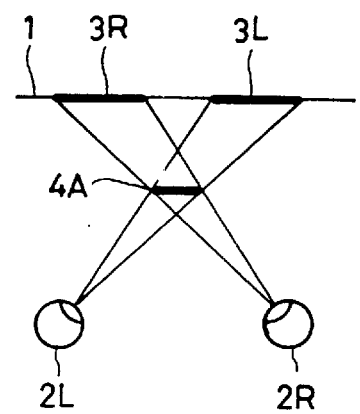
FIGS. 1A and 1B are schematic diagrams for explaining a method of emphasizing a stereoscopic feeling by parallax information.

The right-eye video image 93R is projected onto a right eye 92R and the left-eye video image 93L is projected onto a left eye 92L. As mentioned above, since the left and right eyes 92L and 92R are oriented in the approaching direction, an imaginary image 94A is synthesized at a position in front of a display plane 91 by a cross vergence in a manner similar to the case of FIG. 1A. As mentioned above, the object which is detected such that an edge information amount is large is seen as if it was projected to the front side from the display plane 91.

FIG. 7 shows processes for a signal (object) S11 having a front edge E11 and a rear edge E12 in which an inclination is small and an amplitude is small. The signal S11 shown in FIG. 7 has a delay amount at the center of the variable delay circuits 14L and 14R. In case of the signal S11, the level of the detection signal Sd is small, the delay amount of the variable delay circuit 14L is decreased by the detection signal Sd, and the delay amount of the variable delay circuit 14R is increased by the detection signal Sd'. Therefore, a delay amount for a right-eye video signal S11r corresponding to the signal S11 is increased and the position of the right-eye video image 93R is moved to the right. On the other hand, a delay amount for a left-eye video signal S11$l$ corresponding to the signal S11 is decreased and the position of the left-eye video image 93L is moved to the left.

Figure 1B:
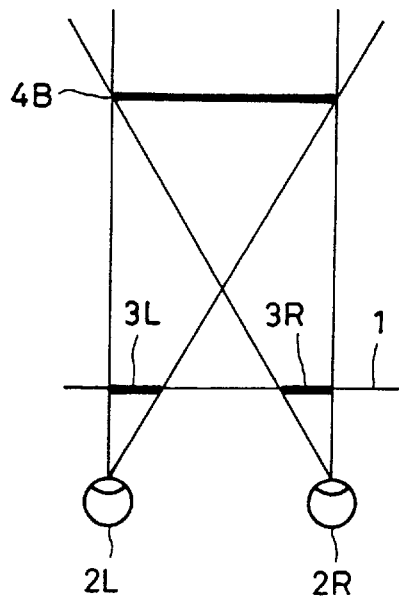
Figure 2:
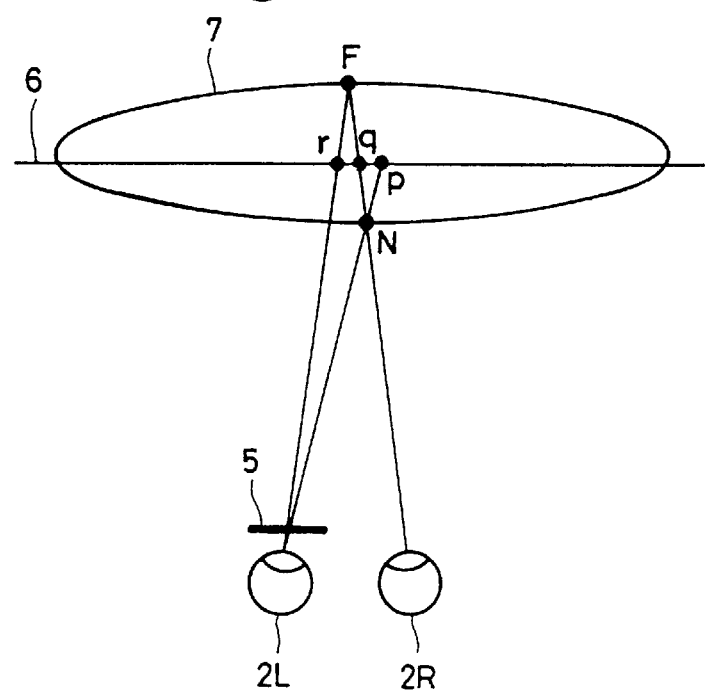
FIG. 2 is a schematic diagram for explaining an effect of pendulum of Pulfrich as an example of the method of emphasizing the stereoscopic feeling by the parallax information.

As mentioned above, the right-eye video image 93R in which the position was controlled is projected to the right eye 92R and the left-eye video image 93L is projected to the left eye 92L. As mentioned above, since the left and right eyes 92L and 92R are oriented in the departing direction, an imaginary image 94B is synthesized at a position to the rear side from the display plane 91 by a parallel vergence in a manner similar to the case of FIG. 1B. As mentioned above, the object which is detected such that an edge information amount is small is seen as if it was projected to the rear side from the display plane 91.

In FIG. 7, pulse signals S21 and S22 are also included together with the signal S11. It is determined that the edge information amounts of those signals are large. As shown in FIG. 7, therefore, a delay amount control opposite to that for the signal S11 is performed for the signals S21 and S22. That is, as shown at S21r and S22r, the signals S21 and S22 are shifted to the left by the variable delay circuit 14R. As shown at S21$l$ and S22$l$, the signals S21 and S22 are shifted to the right by the variable delay circuit 14L. As mentioned above, it is possible to control in a manner such that an edge having a large edge information amount is determined to be a focused region, so that the image is synthesized to the front side from the display plane, while an edge having a small edge information amount is decided to be a region out of a focus, so that the image is synthesized to the rear side from the display plane.

Figure 8:
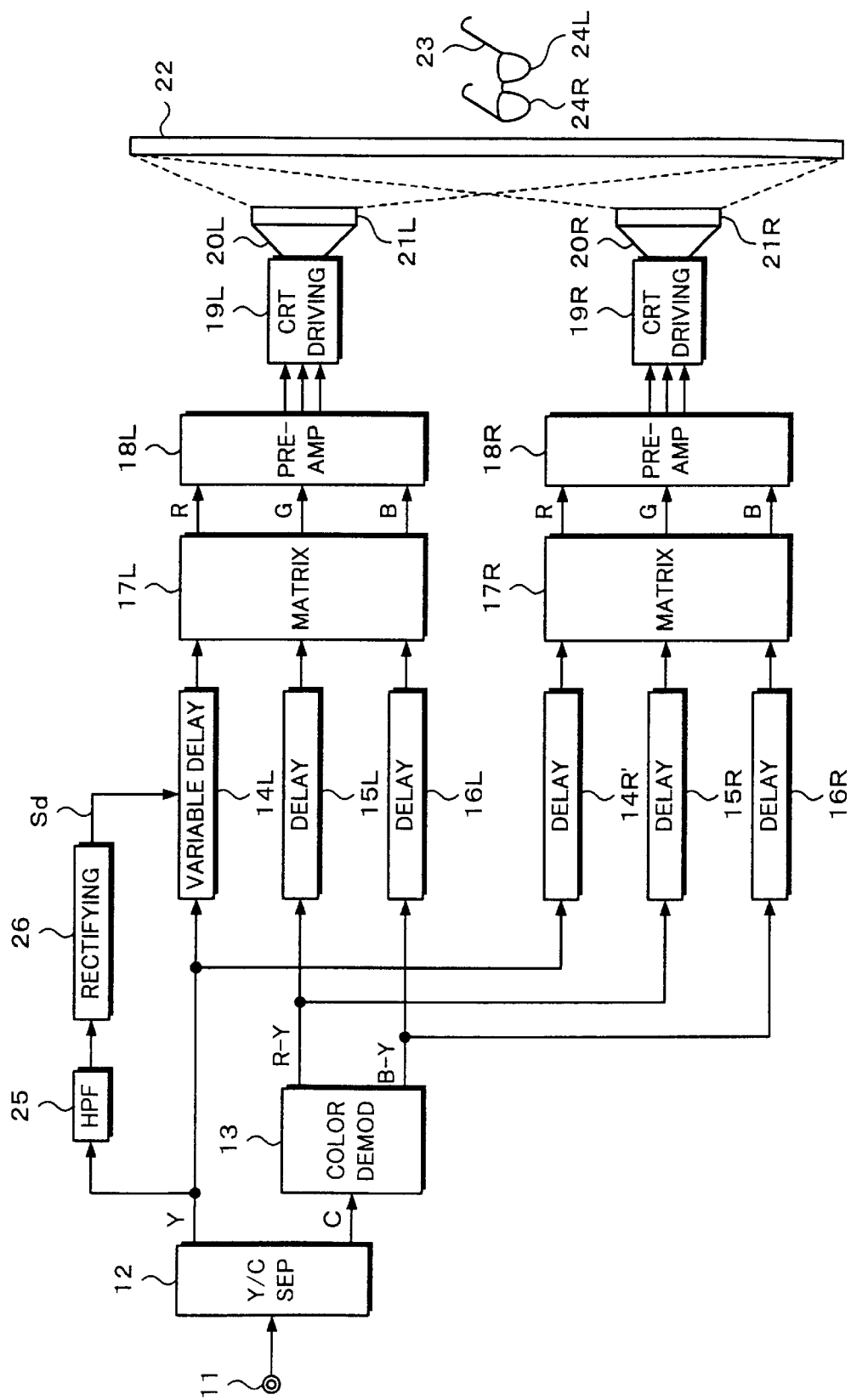
FIG. 8 is a block diagram showing a modification of the first embodiment of the invention.

FIG. 8 shows a modification of the first embodiment of the invention. The portions corresponding to those in FIG. 3 are designated by the same reference numerals. FIG. 8 differs from the construction of FIG. 3 with respect to a point that a fixed delay circuit 14R' is used in place of the variable delay circuit 14R. In the construction of FIG. 3, the left-eye video signal and the right-eye video signal are controlled so as to be delayed in the opposite directions. In the construction of FIG. 8, however, only one left-eye video signal is controlled and a fixed delay is given to the right-eye video signal. Since the control is performed in one direction, although the delay amount is the half of that in case of the control in two directions, it is sufficient to use one variable delay circuit.

Although the control of the time base (position in the horizontal direction) is performed only for the luminance signal, two color difference signals can be also controlled in a manner similar to the luminance signal. Generally, since the resolution is hard to be perceived with respect to the color difference signals as compared with the luminance signal, an effect of enhancing the stereoscopic feeling (front/ rear feeling) can be also derived by the control of only the luminance signal.

The second embodiment of the invention will now be described. Although the two CRTs for projectors have been used in the foregoing first embodiment, according to the second embodiment, a process for doubling a field speed is performed to the input video signal and one CRT is used. For example, the first field between two fields serving as a pair of video signals in which the field speed was doubled is used as a video signal for the left eye and the second field of the field double speed is used as a video signal for the right eye.

Figure 9:
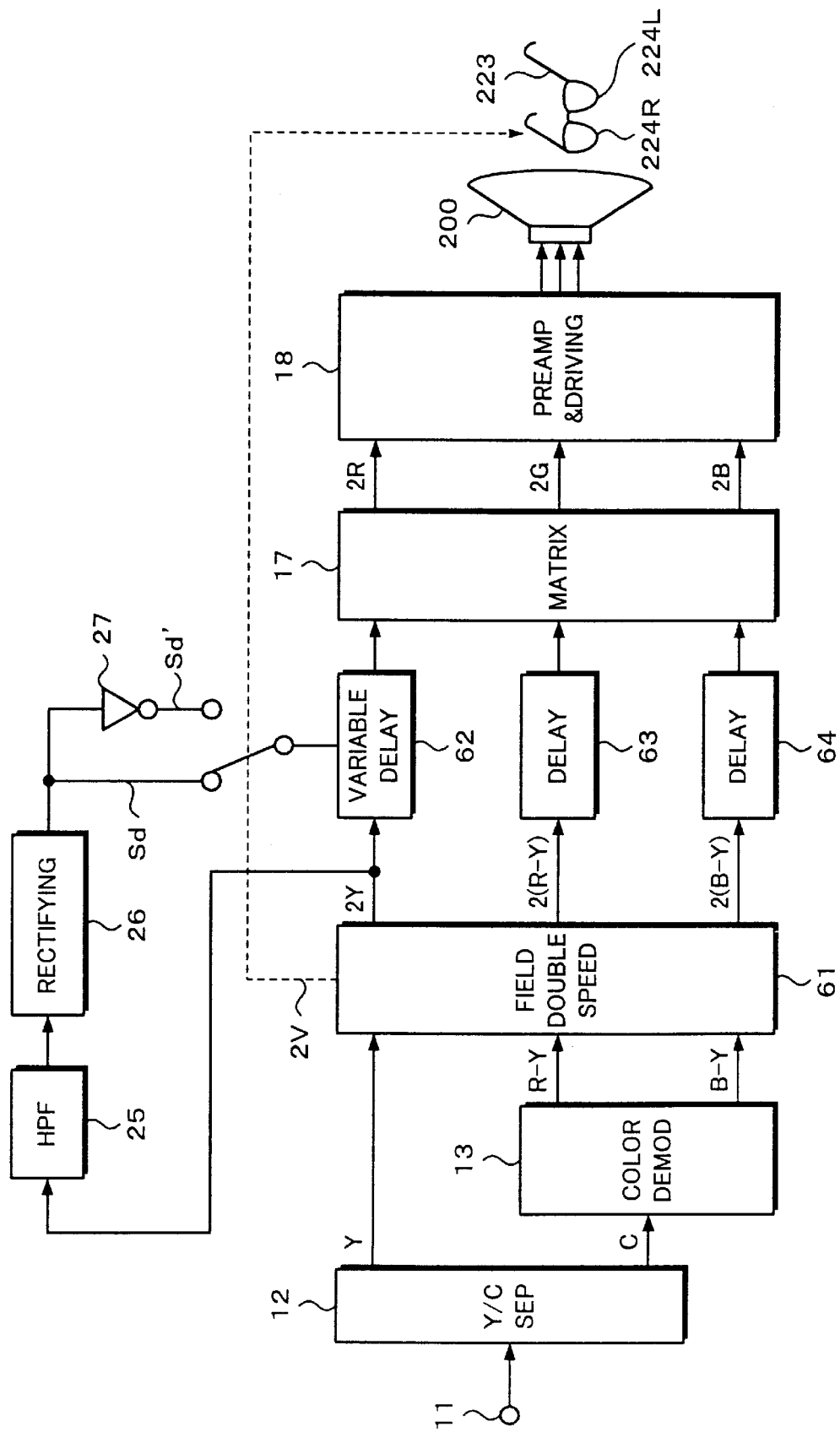
FIG. 9 is a block diagram showing the second embodiment of the invention.

FIG. 9 shows a construction of the second embodiment of the invention. The luminance signal Y and chrominance signal C corresponding to the composite color video signal from the input terminal 11 are obtained by the Y/C separating circuit 12. The luminance signal Y is supplied to a field double speed circuit 61 and the chrominance signal C is supplied to the color demodulating circuit 13. Two color difference signals from the color demodulating circuit 13 are supplied to the field double speed circuit 61. The field double speed circuit 61 forms a video signal in which the field frequency was doubled from the input video signal.

Figure 10:
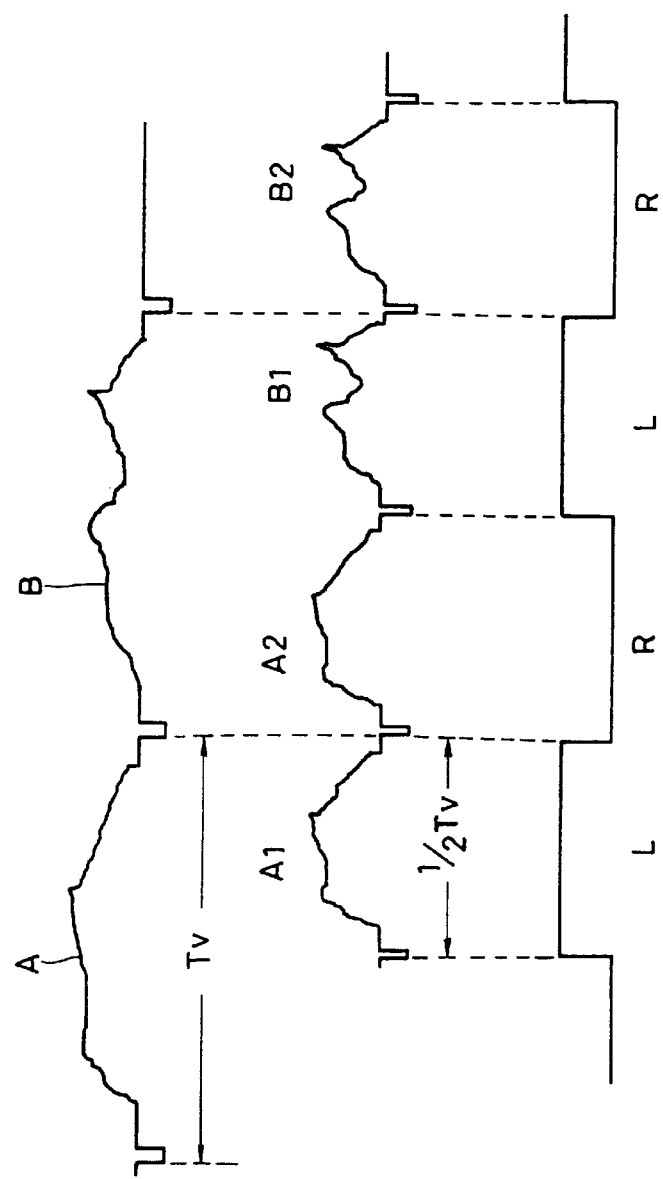
FIGS. 10A to 10C are timing charts for explaining a process for doubling a field speed in the second embodiment.

FIGS. 10A to 10C show processes by the field double speed circuit 61. In FIGS. 10A to 10C, the color difference signals are omitted for simplicity of explanation. When the input luminance signal Y (FIG. 10A) of a field period Tv (1/60 second in case of the NTSC system; 1/50 second in case of the PAL/SECAM system) is supplied, an output luminance signal (FIG. 10B) in which the field period is equal to ½·Tv is formed. That is, a pair of fields A1 and A2 of a double field frequency are formed from a field A of the input luminance signal. A pair of fields B1 and B2 of the double field frequency are formed from a field B.

FIG. 10C shows a pulse signal 2V whose level is inverted every double speed field. Such a double speed process can be performed by a construction such that the video signal is converted into the digital signal and is time base compressed by a digital memory.

In the second embodiment, the first field (A1, B1, . . . ) in which the pulse signal 2V synchronized with the double speed field is at the high level is used as a video signal for the left eye and the second field (A2, B2, . . . ) in which the pulse signal 2V is at the low level is used as a video signal for the right eye. A field double speed luminance signal 2Y and a field double speed color difference signal 2(R−Y) and 2(B−Y) are generated from the field double speed circuit 61.

The double speed luminance signal 2Y is supplied to a variable delay circuit 62. The double speed color difference signals 2(R−Y) and 2(B−Y) are supplied to fixed delay circuits 63 and 64, respectively. The double speed luminance signal 2Y is supplied to the high pass filter 25. An output signal of the high pass filter 25 is supplied to the rectifying circuit 26. The high pass filter 25 and rectifying circuit 26 generate the detection signal Sd according to the amount of edge information in the luminance signal in a manner similar to the first embodiment. The detection signal Sd' which is complementary to the detection signal Sd is formed by the inverter 27.

The detection signal Sd and Sd' are supplied to two input terminals of a switching circuit 65, respectively. An output of the switching circuit 65 is supplied to the variable delay circuit 62 as a signal to control its delay amount. The switching circuit 65 is controlled so as to supply the detection signal Sd to the variable delay circuit 62 for a period of time during which the pulse signal 2V is at the high level, namely, for a period of time of the video signal for the left eye and to supply the detection signal Sd' which is outputted from the inverter 27 to the variable delay circuit 62 for a period of time during which the pulse signal 2V is at the low level, namely, for a period of time of the video signal for the right eye.

Therefore, in the variable delay circuit 62, the left-eye video signal is delayed by the detection signal Sd and the right-eye video signal is delayed by the detection signal Sd'.

The luminance signal from the variable delay circuit 62 and the two color difference signals from the fixed delay circuits 63 and 64 are supplied to a matrix circuit 17. Three primary color signals 2R, 2G, and 2B of the field double speed are formed by the matrix circuit 17. The three primary color signals are supplied to a CRT 200 through a preamplifier and driving circuit 18. The CRT 200 can display a field double speed color video signal. That is, a vertical scanning frequency and a horizontal scanning frequency of the CRT 200 are set to be twice as high as the frequencies in case of displaying the video signals in which a field speed is not a double speed. The video image for the left eye and the video signal for the right eye having the parallax information which were formed by the variable delay circuit 62 are displayed on the CRT 200 by the double speed field.

Further, by wearing glasses 223 having shutters 224L and 224R on the left and right sides and observing the images, the left and right eyes can see the video image for the left eye and the video image for the right eye, respectively. Shutters which can be electrically turned on/off, for example, liquid crystal shutters can be used as shutters 224L and 224R, respectively. The shutters 224L and 224R are controlled so as to execute the on/off operations by the pulse signals synchronized with the pulse signal 2V. For example, the pulse signal 2V is received by an infrared transmission from the receiver side, the shutter 224L is turned on and the shutter 224R is turned off for a period of time during which the pulse signal 2V is at the high level. For a period of time during which the pulse signal 2V is at the low level, the on/off states are inverted. Thus, the video image for the left eye and the video image for the right eye which are displayed by the CRT 200 can be seen by the left and right eyes, respectively.

In the second embodiment of the invention shown in FIG. 9 as well, it is also possible to control in a manner such that the delay amount of only one of the left-eye video signal and the right-eye video signal can be varied and the other delay amount is fixed.

In the foregoing first and second embodiments of the invention, the front/rear feeling is detected on the basis of the edge information and the edge information is detected on the basis of the luminance signal. The invention is not limited to the luminance signal but the edge information can be also detected on the basis of the three primary color signals R, G, and B.

Figure 11:
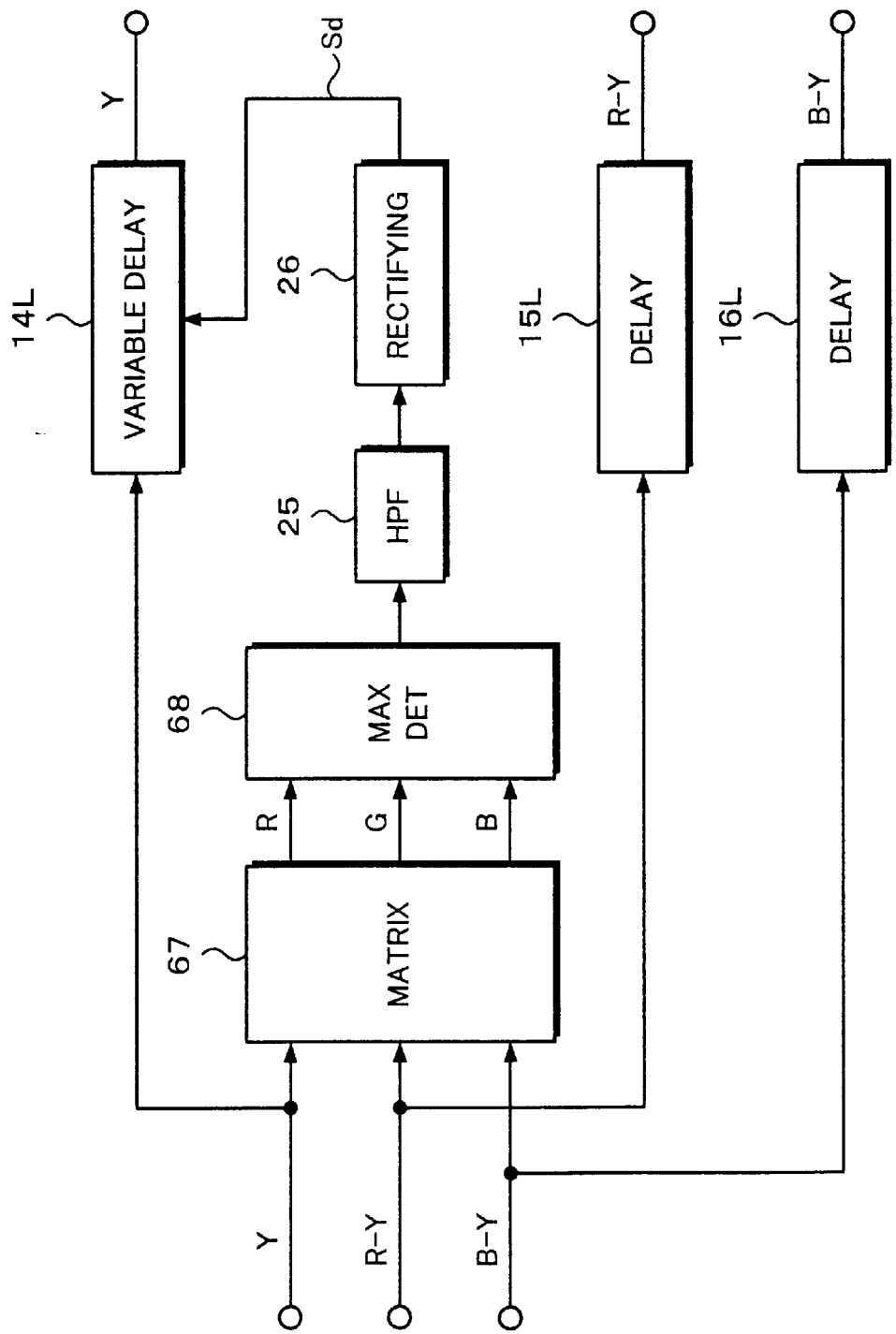
FIG. 11 is a block diagram showing another example of a construction to detect a front/rear feeling.
Figure 12:
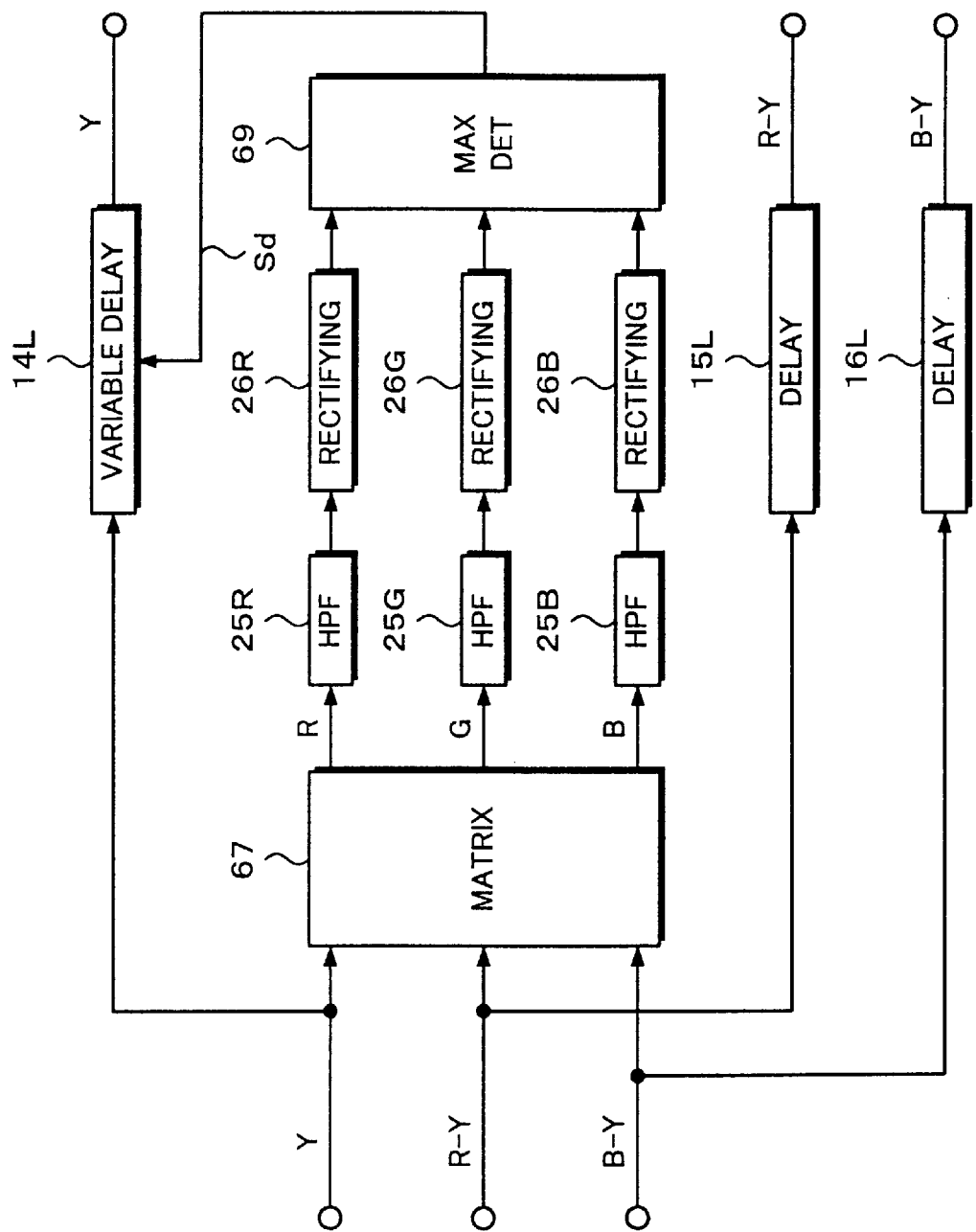
FIG. 12 is a block diagram showing still another example of a construction to detect a front/rear feeling.

An example of a construction to detect the edge information on the basis of the three primary color signals R, G, and B is shown in FIG. 11. Another example is shown in FIG. 12. These two constructional examples are realized by applying the invention to the first embodiment of the invention shown in FIG. 3 or 8. The luminance signal from the Y/C separating circuit 12 and the two color difference signals from the color demodulating circuit 13 are supplied to a matrix circuit 67.

The three primary color signals R, G, and B generated from the matrix circuit 67 are supplied to a maximum value detecting circuit 68. The maximum value detecting circuit 68 detects the maximum value among the three primary color signals R, G, and B and outputs the detected maximum value. An output signal of the maximum value detecting circuit 68 is supplied to the rectifying circuit 26 through the high pass filter 25, so that the detection signal Sd is generated from the rectifying circuit 26. The detection signal Sd is formed on the basis of the signal which was detected to be the maximum value among the three primary color signals.

The delay amount of the variable delay circuit 14L is controlled by the detection signal Sd from the rectifying circuit 26. As mentioned above, this control is performed on the basis of the edge information so as to enhance the stereoscopic feeling. The luminance signal Y from the variable delay circuit 14L, the color difference signal (R−Y) from the fixed delay circuit 15L, and the color difference signal (B−Y) from the fixed delay circuit 15R are supplied to the matrix circuit 17. In the construction of FIG. 3, the detection signal Sd is supplied to the variable delay circuit 14R through the inverter.

In the construction shown in FIG. 12, the three primary color signals formed by the matrix circuit 67 are supplied to high pass filters 25R, 25G, and 25B, respectively. Outputs of the high pass filers 25R, 25G, and 25B are supplied to rectifying circuits 26R, 26G, and 26B, respectively. Output signals of the rectifying circuits 26R, 26G, and 26B are supplied to a maximum value detecting circuit 69, respectively. The maximum value among the output signals of the rectifying circuits 26R, 26G, and 26B is taken out as a detection signal Sd to an output of the maximum value detecting circuit 69. In the construction of FIG. 12, the process for forming the detection signal is executed on the basis of each of the three primary color signals and the maximum value among the formed signals is outputted as a detection signal Sd.

According to the system for detecting the front/rear feeling on the basis of the three primary color signals R, G, and B, although the matrix circuit 67 and maximum value detecting circuits 68 and 69 are needed as compared with the system for detecting the front/rear feeling from the luminance signal, a more natural front/rear feeling can be produced. The construction shown in FIG. 11 or 12 is not limited to the first embodiment using the projector but can be also applied to the second embodiment using the double speed field process.

Figure 13A:
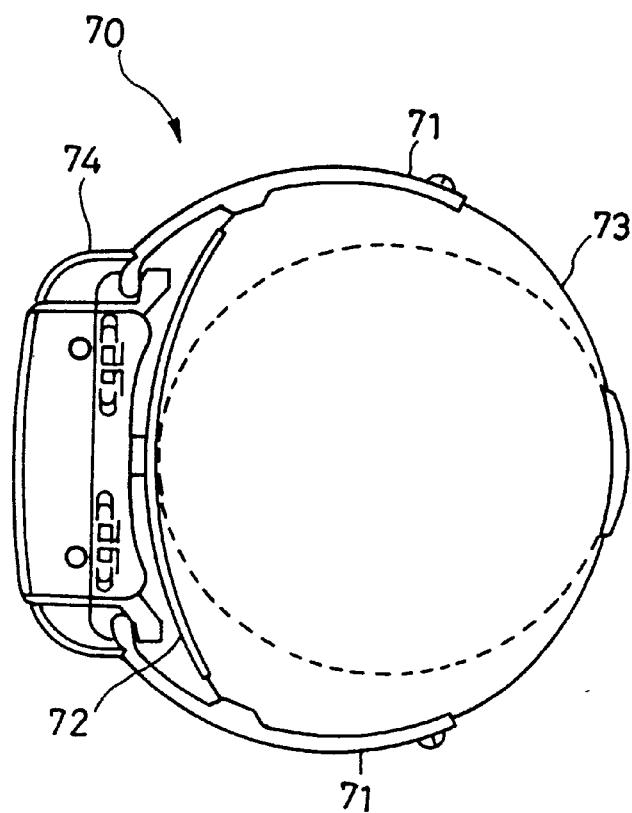
FIGS. 13A and 13B are schematic diagrams which is used for explaining a display apparatus of the glasses type which is used in the third embodiment of the invention.
Figure 13B:
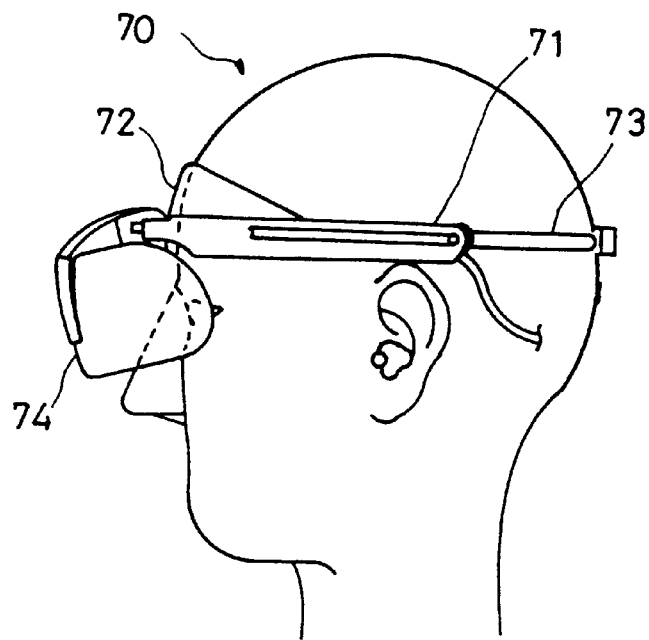

Further, according to the third embodiment of the invention, a liquid crystal display apparatus of the glasses type is used besides the projector and field double speed CRT. FIGS. 13A and 13B show an example of such a display apparatus. FIGS. 13A and 13B are diagrams when states where the liquid crystal display apparatus of the glasses type (shown at 70) is attached to the head portion of a person are seen from the top direction and from the lateral direction, respectively. The display apparatus 70 is attached to the head portion by a string 71 and expandable bands 72 and 73. An optical system including the liquid crystal display is constructed in a casing 74 attached to the front portion.

Figure 14:
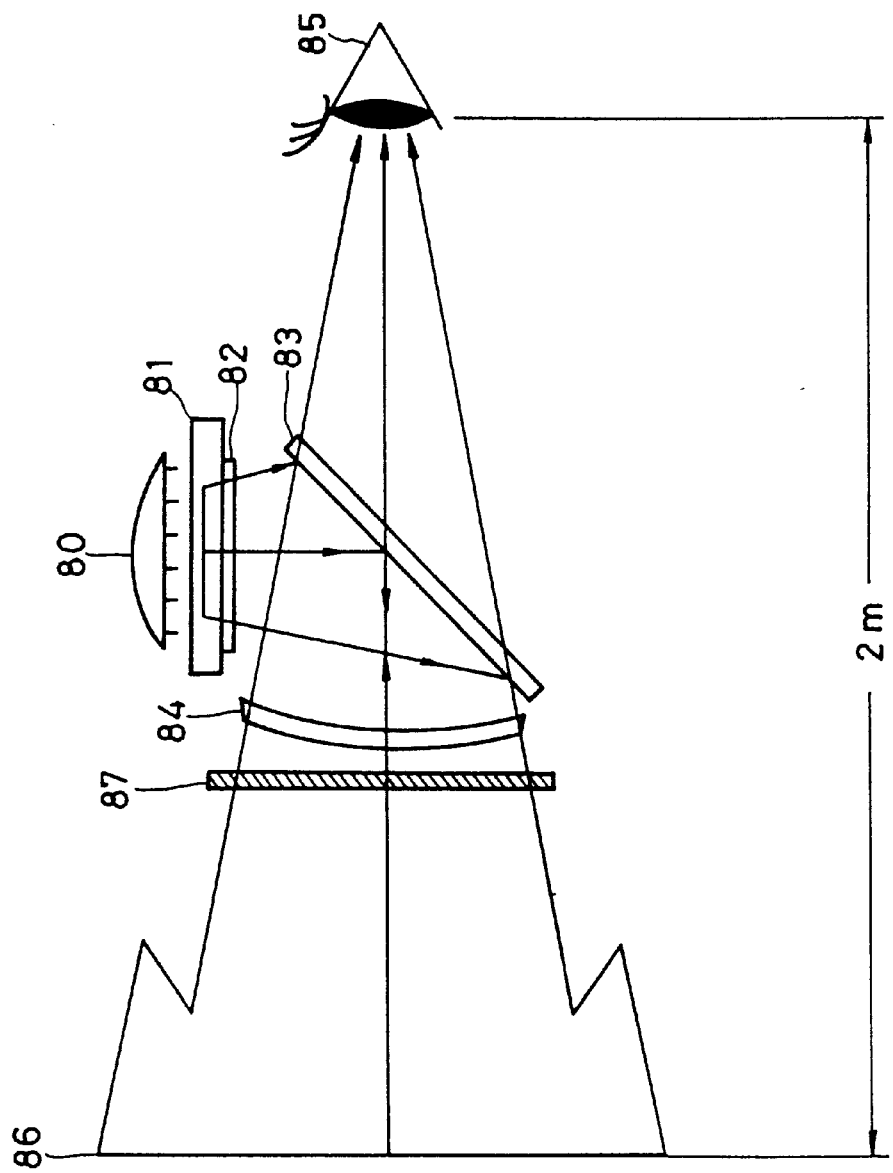
FIG. 14 is a schematic diagram which is used for explaining an optical system of the glasses type display apparatus.

FIG. 14 schematically shows the optical system constructed in the casing 74. A color liquid crystal display panel 81 is driven on the basis of a video signal which is supplied. Two liquid crystal display panels formed so as to be seen by the right and left eyes, respectively, are used. FIG. 14 shows a construction of one side. Reference numeral 80 denotes a back light of a white fluorescent lamp or the like and 82 indicates a diffuser (diffusing plate).

Display light of the liquid crystal display panel 81 is reflected by a half mirror 83 and enters a concave half mirror 84. The video light reflected by the concave half mirror 84 enters an eye 85 through the half mirror 83. Therefore, the video image on the liquid crystal display panel 81 can be seen through the half mirror 83. Since the concave half mirror 84 is provided, the operator can feel the video image as if it was displayed larger and farther from the position of the actual concave half mirror 84. For example, the operator can feel as if a video image 86 was virtually displayed with a size of a screen of 52 inches at a distance of about 2 m from the position of the eye 85.

The two liquid crystal display panels 81 are provided so that they can be separately seen by the right and left eyes. The left-eye video image and the right-eye video image processed in a manner similar to the foregoing first embodiment are respectively displayed on each liquid crystal display panel, so that the stereoscopic feeling can be enhanced. FIG. 15 shows a signal processing system in case of using the liquid crystal display of the glasses type. The three primary color signals processed in a manner similar to the construction of FIG. 3 are supplied to liquid crystal driving circuits 28L and 28R. Liquid crystal display panels 29L and 29R are driven by outputs of the driving circuits 28L and 28R, respectively. Further, even in case of using one liquid crystal display panel, by using the field double speed process and the shutter as in the second embodiment, the stereoscopic feeling can be enhanced.

The construction of FIG. 15 slightly differs from the construction of FIG. 13 and is realized by two small displays (not limited to the liquid crystal) which depend from or are located at the whole surface of the head portion without using the head band. However, with respect to a point using the two small displays, the same signal processing step as that in FIG. 15 is performed. (The LCD is changed to the small display.)

In the fourth embodiment (not shown) of the invention, the front/rear feeling is detected by using the luminance signal or the three primary color signals in a manner similar to the first embodiment mentioned above. Depth information is controlled (modulated) by the detection result in place of the position in the horizontal direction. For example, a plurality of liquid crystal display panels are laminated, the foreground is displayed on the liquid crystal display panel on the front side, and the background is displayed on the liquid crystal display panel on the rear side. A display which can display depth information other than the multilayer liquid crystal display panel can be also used.

The present invention is not limited to the foregoing embodiments but many modifications and variations are possible within the spirit and scope of the appended claims of the invention.

What is claimed is:

1. A video display method of receiving an input video signal and forming a video signal which is displayed on a display apparatus, comprising the steps of:
   detecting edge information of said input video signal by determining a maximum value among three primary color signals of said input video signal; and
   detecting a front/rear relation of an object in a video image of said input video signal on the basis of said detected edge information.

2. A video display method according to claim 1, further comprising the steps of:

controlling a position of the image so as to be moved in the horizontal direction on the basis of said detected front/rear relation; and displaying a video image having a right/left parallax formed as a result of said control.

3. A video display method according to claim 1, further comprising the steps of:

modulating depth information as stereoscopic information on the basis of said detected front/rear relation; and displaying a video image having said modulated depth information.

4. A video display method according to claim 1, wherein said edge information is an inclination and an amplitude of an edge in said input video signal.

5. A video display method according to claim 1, wherein said edge information is detected by determining the maximum value among high frequency components of the three primary color signals of said input video signal.

6. A video display method according to claim 5, wherein said edge information is detected by determining the maximum value among rectified high frequency components of the three primary color signals.

7. A video display method according to claim 1, wherein said edge information is detected from a luminance signal in a color video signal.

8. A video display apparatus for receiving a video signal and forming a video signal which is displayed on a display apparatus, wherein edge information of said input video signal is detected by determining a maximum value among three primary color signals of said input video signal and a front/rear relation of an object in a video image is detected on the basis of said detected edge information.

9. An apparatus according to claim 8, wherein said video display apparatus is a projection type display using two cathode ray tubes (CRTs) for projectors.

10. An apparatus according to claim 8, wherein said video display apparatus is one cathode ray tube (CRT) in which a field double speed process has been performed to the input video signal.

11. An apparatus according to claim 8, wherein said video display apparatus is a liquid crystal display apparatus of a glasses type.

12. A video display apparatus for receiving a video signal and displaying a video signal on a display apparatus, comprising:

detecting means for detecting edge information of said input video signal by determining a maximum value among three primary color signals of said input video signal and detecting a front/rear relation of an object in a video image on the basis of said detected edge information; and means for controlling a position of the image so as to be moved in the horizontal direction on the basis of said detected front/rear relation, wherein a video image having a right/left parallax formed as a result of said control is displayed.

13. An apparatus according to claim 12, wherein said video display apparatus is a projection type display using two cathode ray tubes (CRTs) for projectors.

14. An apparatus according to claim 12, wherein said video display apparatus is one cathode ray tube (CRT) in which a field double speed process has been performed to the input video signal.

15. An apparatus according to claim 12, wherein said video display apparatus is a liquid crystal display apparatus of a glasses type.

16. A video display apparatus for receiving a video signal and displaying a video signal on a display apparatus, comprising:

means for detecting edge information of said input video signal by determining a maximum value among three primary color signals of said input video signal; and means for modulating depth information as stereoscopic information in accordance with said detected edge information, wherein a video image having said modulated depth information is displayed.

17. An apparatus according to claim 16, wherein said video display apparatus is a projection type display using two cathode ray tubes (CRTs) for projectors.

18. An apparatus according to claim 16, wherein said video display apparatus is one cathode ray tube (CRT) in which a field double speed process has been performed to the input video signal.

19. An apparatus according to claim 16, wherein said video display apparatus is a liquid crystal display apparatus of a glasses type.

* * * * *